United States Patent [19]

Hawkins et al.

[11] Patent Number: 5,504,777

[45] Date of Patent: *Apr. 2, 1996

[54] COMMUNICATIONS SYSTEM USING OPEN ARCHITECTURE BUS LINES

[75] Inventors: Steve K. Hawkins, Plano; Bruce R. Whitney, Terrell, both of Tex.

[73] Assignee: E-Systems, Inc., Dallas, Tex.

[ * ] Notice: The term of this patent shall not extend beyond the expiration date of Pat. No. 5,384,805.

[21] Appl. No.: 84,622

[22] Filed: Jul. 1, 1993

Related U.S. Application Data

[63] Continuation-in-part of Ser. No. 959,258, Oct. 9, 1992, Pat. No. 5,384,805.

[51] Int. Cl.[6] .................................................. H04B 1/38
[52] U.S. Cl. ............................ 375/222; 370/85.1
[58] Field of Search ........................ 370/110.1, 85.1; 375/222

[56] References Cited

U.S. PATENT DOCUMENTS

| | | | |
|---|---|---|---|
| 5,122,691 | 6/1992 | Balakrishnan | 370/110.1 |
| 5,195,092 | 3/1993 | Wilson et al. | 370/110.1 |
| 5,384,805 | 1/1995 | Hawkins et al. | 375/222 |

Primary Examiner—Stephen Chin
Assistant Examiner—Timothy J. May
Attorney, Agent, or Firm—Harold E. Meier

[57] ABSTRACT

A communications system programmable to operate at a selected one of multiple frequency ranges and any one of a plurality of modulations schemes and data rights including an open architectural bus line for linking a plurality of board level units. A single board receiver exciter operates to receive and transmit signals at a plurality of frequencies and contains means for interfacing the single board receiver exciter with the open architectural bus line. A single board modulator demodulator allows for modulation/demodulation and for encoding/decoding of signals. The single board modulator demodulator also includes means for interfacing with the open architecture bus lines so that instruction and programming commands may be received. A single board processor multiplexer controls operations of the single board receiver exciter and the single board processor multiplexer over the communications link created by the open architecture bus line. The communication system further comprises a multimedia processor chassis for physically enclosing the single board receiver exciter, the single board modulator/demodulator, the single board processor multiplexer, and the open architecture bus line.

18 Claims, 11 Drawing Sheets

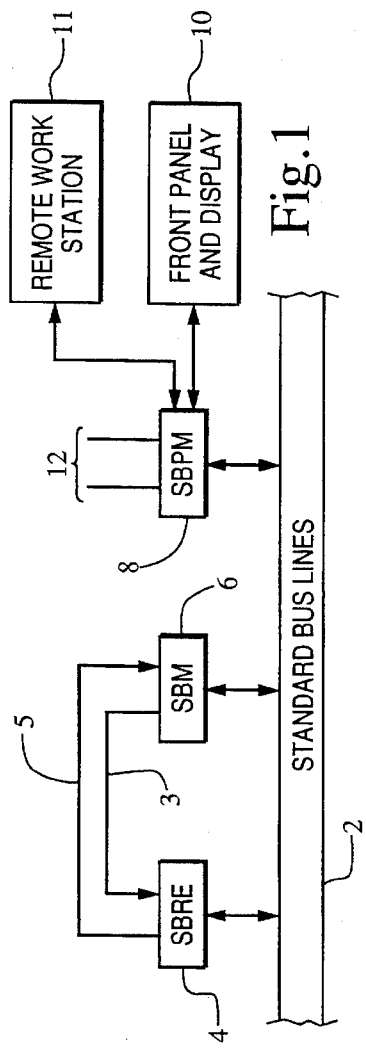
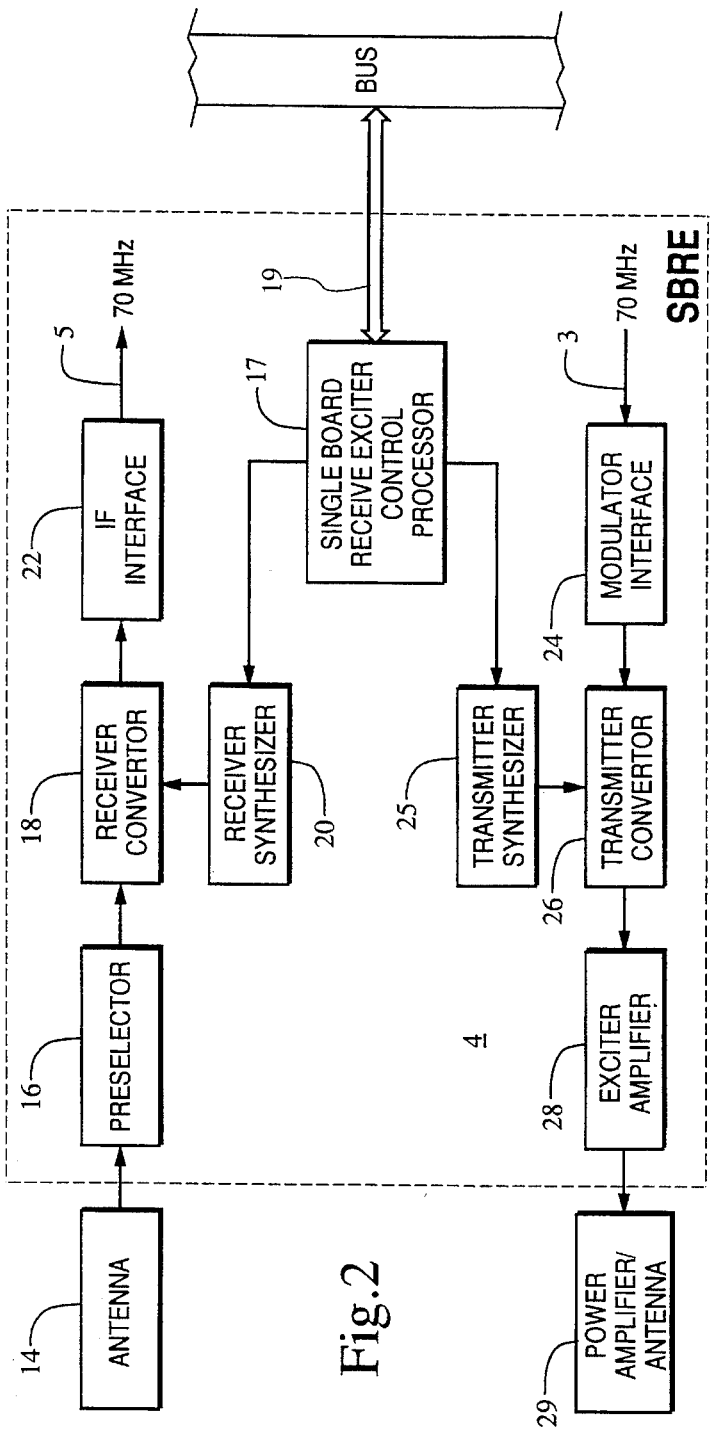

COMMUNICATIONS SYSTEM USING OPEN ARCHITECTURE BUS LINES

RELATED APPLICATION

This application is a continuation in part of currently application Ser. No. 07/959,258 filed Oct. 9, 1992 now U.S. Pat. No. 5,384,805.

TECHNICAL FIELD

This invention relates to communication systems, and more particularly to the application of communication systems to an open architecture bus configuration.

BACKGROUND OF THE INVENTION

Most present communication systems are based upon box level designs. Current receiver/exciter, demodulation, modulation and baseband communication systems consist of several box units contained within a rack structure taking up a great deal of space. Typically, each box unit performs only a single designated function.

Box level designs are undesirable because each box unit may not be reconfigured to perform additional functions. Thus, in order to upgrade the capabilities of the communications system, one or more box unit must be added to the existing hardware. Present approaches also require that additional upgrades to these systems be customized, thus, creating a new box unit to be added to the existing hardware. Existing box units perform a limited number of functions and may not be easily reconfigured to perform additional or different functions. The addition of functions to a system requires new or additional box units to upgrade the system. The new boxes require the use of additional rack space which may not be available in the rack structure.

A box unit based system also creates extensive cabling problems. Whenever a new box is added to the communications system, new cabling must be added for the box. If several new boxes are added, the problems and expense involved with running additional cable to the boxes may include moving existing box structures to make room for the cabling pathway, individually cabling each box into the system and overcoming problems associated with the differing box interfaces. The fact that each box is individually cabled into the system also prevents extensive system remodification from being easily carried out because of the time and investment required for recabling and rack modification.

Present communication systems also constrain the operation of existing box units to a limited number of functions. If a box unit should become disabled while in operation and spare units are not available, the system cannot be easily reconfigured to accommodate the failed unit. The lack of flexibility in present communication systems also causes extensive down time while reconfiguration of the communication system takes place.

Thus, a need has arisen for a communications system offering flexible operating parameters, having the ability to be easily reconfigured for varying applications, and having fewer physical reconfiguration, cabling and spacing problems than are associated with presently existing communication systems.

SUMMARY OF THE INVENTION

The present invention overcomes the foregoing and other problems by using an open architecture based communication system implementation. The invention consists of a single board receiver exciter (SBRE), a single board modulator/demodulator (SBM), and a system control processor known as a single board processor multiplexer (SBPM). Each of these elements is capable of plugging into a standard bus architecture such as a VME bus or FutureBus contained within a multi-media processing chassis (MMPC). Instead of requiring an entire box unit for each of the above-mentioned elements, the elements are implemented on single 6 U or 9 U (160 mm or 220 mm) cards. Thus, the space requirements for a communication system utilizing the above assemblies is drastically reduced over currently available box-level solutions.

The configuration of the SBRE and SBM boards allows for the flexible and adaptable operation of the communication system. The boards may operate at a variety of frequency levels such as HF, UHF, SHF, EHF, VHF, etc. Also, the boards are programmable to operate at a variety of modulation schemes, bit rates and data formats according to operation selection. Thus, a board need not be changed or replaced to reconfigure the communications system. The flexibility and adaptability of the present system is achieved by implementing many functions of a receiver/exciter and modulation/demodulation normally implemented by hardware elements using software elements. Programming and control commands for implementing and changing between the plurality of functions (frequencies and modulations) are sent to the board units from the SBPM over the standard bus architecture provided by the MMPC.

The SBRE consists on the receiver side of a preselector, converter, synthesizer, and demodulation intermediate frequency (IF) interface. On the transmitter side are the exciter/amplifier, converter, synthesizer and modulation IF interface. A controller processor connected to the transmitter and receiver sides allows for control of the board components over the standard bus interface. The modulation/demodulation and decoder/encoders of the SBM are also implemented in software allowing for change of the type of modulation and the bit rates of the SBM in response to commands received over the standard bus interface.

A single board processor multiplexer SBPM operates as a multifunctional communications device and system controller. The SBPM is a programmable device capable of operating in a multiplexing mode, a controller mode, and an intelligent input/output interface mode. The SBPM may be programmed via instruction from the bus line over a standard bus interface.

The elements are physically based within the multi-media processor chassis (MMPC) that provides the necessary standard bus lines for interaction between elements. The MMPC is reconfigurable to handle various information security levels and varying quantities of elements and units. The MMPC has adaptable front panel controls/indicators and application configurable rear panel connectors.

Reprogramming of the system software is achieved by means of a keyboard and display panel locally attached to the bus architecture provided by the MMPC or over a remote work station connected by a network to the SBPM. The SBPM is responsible for controlling the command data flow along the standard bus between the SBM and the SBRE and for monitoring the status of the boards during operation of the system and for facilitating operational control of the keyboard and display panel.

BRIEF DESCRIPTION OF THE DRAWINGS

For a more complete understanding of the present invention and the advantages thereof, reference is now made to the following detailed description taken in conjunction with the accompanying drawings in which:

FIG. 1 is a block diagram illustrating the system architecture of the present invention;

FIG. 2 is a block diagram illustrating the structure of the single board receiver exciter (SBRE) of the present invention;

DETAILED DESCRIPTION OF THE INVENTION

Figure 3:
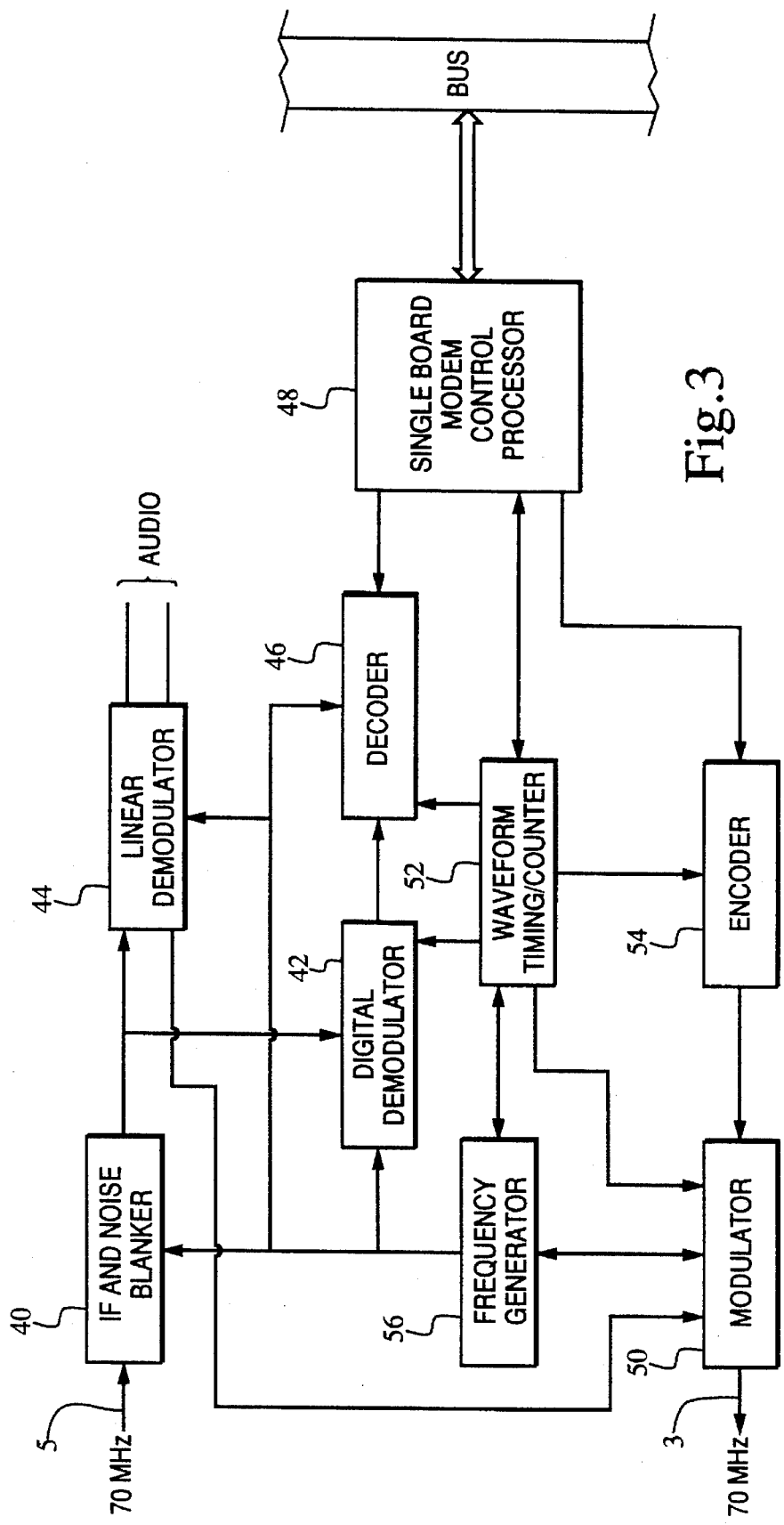
FIG. 3 is a block diagram illustrating the structure of the single board modulator (SBM) of the present invention.

Referring now to FIG. 1, there is shown an illustration of the open architecture system of the present invention. The system operates off a standard bus line architecture such as a VME or FutureBus. Connected to the bus 2 are a single board receiver/exciter (SBRE) 4, a single board modulator/demodulator (SBM) 6, and a single board (SBPM) processor multiplexer 8. Each unit is implemented on a single 6 U or 9 U card. The system provides expansion flexibility because additional SBRE 4 and SBM 6 boards may be added to increase the capabilities of the system or the boards may be software configured or reprogrammed to perform other functions as will be described in more detail herein. Communications between the SBRE 4 and SBM 6 occur over two IF transmission lines 3 and 5.

The SBRE 4 is the conversion center of the system. This board provides full duplex communication capabilities and covers a variety of frequencies depending on how the SBRE 4 is programmed by the system operator during system initialization. The SBM 6 is a multi-purpose, multi-media modem. The majority of the modulation and encoding functionality of the SBM is processed using a software based design. This allows for a high degree of flexibility for the SBM 6 in the modulation type and signal rate utilized by the system.

The single board processor multiplexer (SBPM) 8 is responsible for the downloading of instructions to the SBRE 4 and the SBM 6 during system initialization and for controlling the boards during system operation. The instructions loaded into the SBRE 4 and the SBM 6 control how the system will operate. The instructions may be passed by the system operator to the SBPM 8 from a front panel display and keyboard 10 locally interfaced to the SBPM or over a network connection from a remote work station 11.

Figure 8:
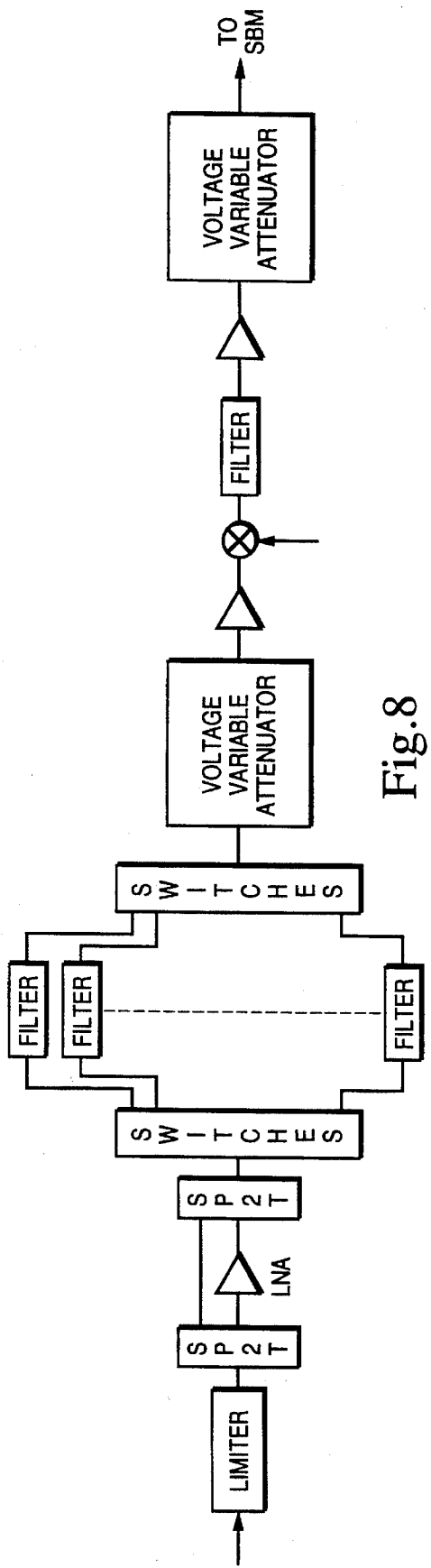
FIG. 8 is a block diagram illustrating the preselector of the single board receiver exciter.

Referring now to FIG. 2, there is shown a block diagram of the SBRE 4 of the present invention. The signal to the receiver side of the SBRE 4 is input from an external antenna/low noise amplifier (LNA) 14. From the antenna/LNA 14, the signal passes to a receive-side preselector 16. In the receive-side preselector 16 (as shown in FIGS. 2 and 8), the signal is amplified and passed through a bank of band-pass filters to remove unwanted frequencies, noise and distortion. The receive-side preselector 16 consists of an input amplifier stage, an input filter switch, a bank of band-pass filters, an output switch, and an output amplifier and mixer. The input amplifier is a switchable low-noise amplifier having approximately 16 dB of gain and a noise figure of 2 dB. The input filter switch is a pin diode using GaAs technology to achieve a low loss and high dynamic range. The filter bank is a series of separate 8 pole, lumped element filters. Each filter has a bandwidth of 35 MHz and the filters are centered on 35 MHz incremental spacing starting at 242 MHz. The output switch is identical to the input switch. The tuning of the preselector is completed by the selection of the proper preselector filter in response to a signal from a single board receiver exciter control processor (SBRECP) 17.

Figure 9:
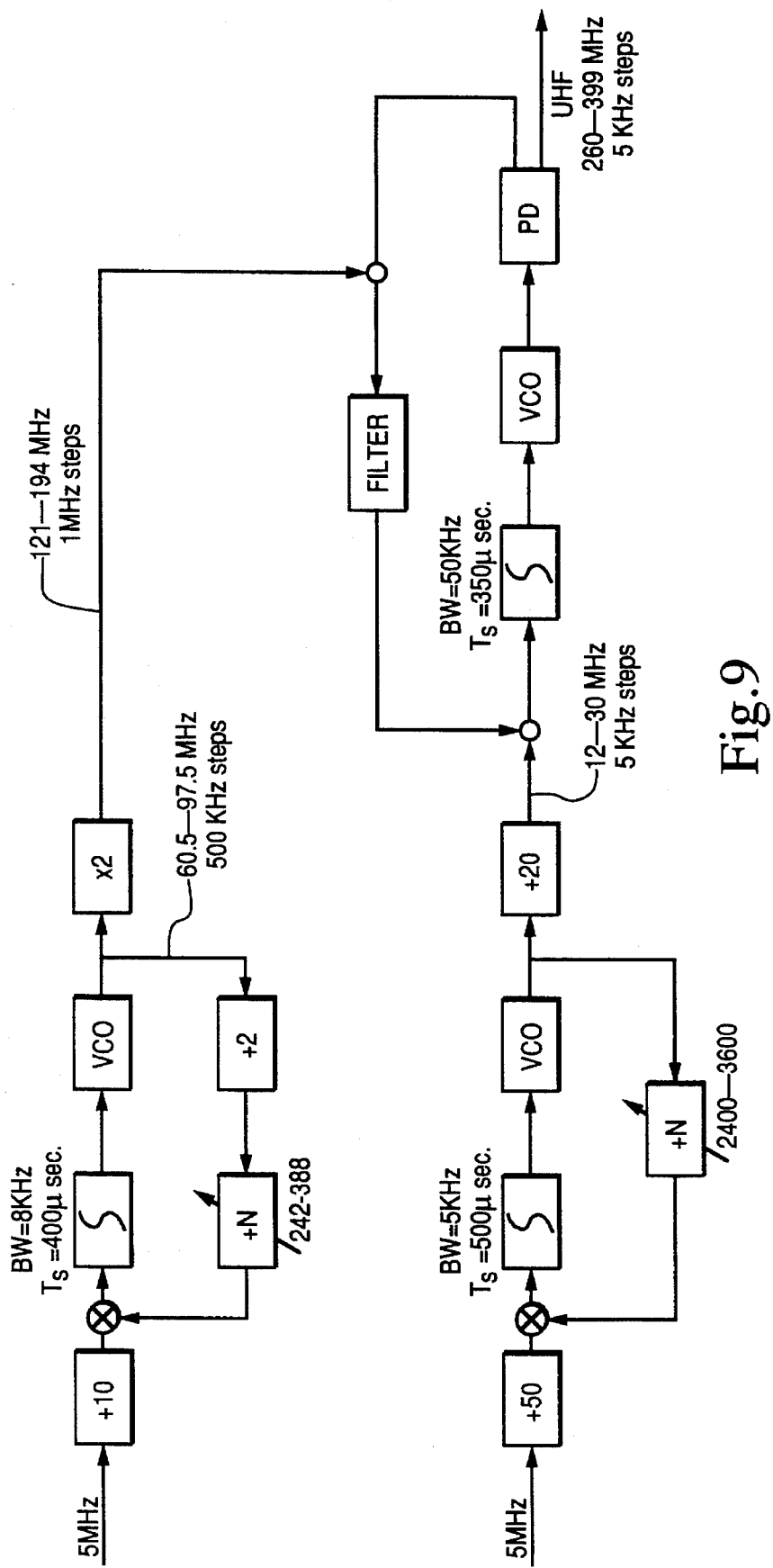
FIG. 9 is a block diagram illustrating the receiver and transmitter synthesizers of the single board receiver exciter.

After the amplification and filtering of the signal by the receive-side preselector 16, the signal passes to a receiver converter 18. At the receiver converter 18, the signal is mixed with an oscillator signal from a receiver synthesizer 20 (as shown in FIGS. 2 and 9) to convert the receive signal to a 70 MHz intermediate frequency (IF) signal for transmission to the SBM 6. The receiver converter 18 is a high dynamic range and high isolation double balanced mixer. The output of the mixer is filtered and transmitted to the SBM 6 via line 5 by means of an IF interface 22.

On the transmitter side of the SBRE 4, a signal is received from the SBM 6 over a 70 MHZ intermediate frequency (IF) modulator interface 24. The signal received on line 3 is mixed with an oscillator signal generated by a transmitter synthesizer 25 in a transmitter converter 26 to translate the 70 MHz IF modulated signal from the SBM to the desired output frequency range. The construction of the transmitter converter 26 is the same as that of the receiver converter 18.

Figure 10:
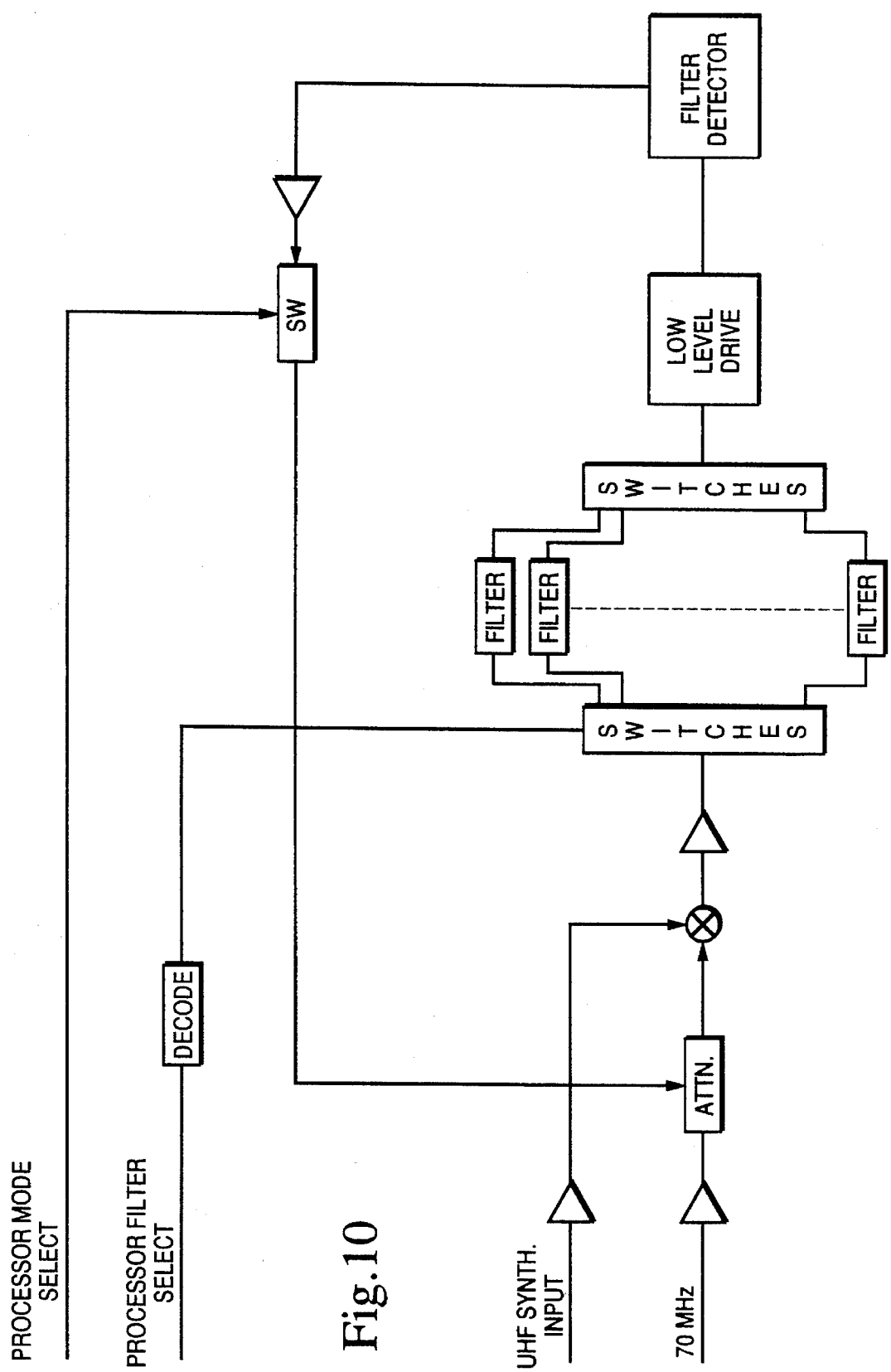
FIG. 10 is a block diagram illustrating the exciter amplifier of the single board receiver exciter.

The signal then passes to an exciter amplifier 28 (as shown in FIGS. 2 and 10) where a bank filter scheme similar to the filters of the receive-side preselector 16 removes spurious mixing products and harmonics from the signal and amplifies the signal for transmission. The exciter amplifier 28 is essentially the same circuitry used in the receive-side preselector 16 except that a monolithic amplifier chain follows the output filter switch to amplify the signal for transmission.

The receiver and transmitter synthesizers (20 and 25) used in the SBRE 4 generate the oscillator signals sent to the transmitter and receiver converters 26 and 18. The receiver synthesizer 20 converts the received signal into a 70 MHz IF signal or according to operator frequency selection. The transmitter synthesizer converts IF signals received over line 5 into variable transmission frequencies as selected by the system operator. The synthesizers are controlled (frequency and bandwidth) by the SBRECP 17. The SBRE synthesizers as shown in FIG. 9 have a multi-looped phase locked indirect synthesizer configuration with three dependent loops enabling rapid tuning while providing very low phase noise and spurious outputs. The synthesizer output covers a range of 225–399,995 MHz in 5 KHz increments.

The main purpose of the SBRECP software is to process commands received over the bus interface 19 to control the operating modes and frequencies of the SBRE 4. The SBRECP 17 receives commands from the SBPM 8 to establish the transmit and receive frequencies of the system by affecting the operation of the synthesizer 20 and 25, the power amplifier settings and the antenna switch selections to be used by the synthesizer. The SBRECP 17 controls the filter selection within the receive-side preselector 16 and exciter/amplifier 28 to achieve the desired filtering characteristics. Also, the SBRECP 17 tunes the receiver and transmitter synthesizers (20 and 25) to generate oscillator frequencies necessary to achieve the output frequencies designated by the SBPM 8. The software within the SBRECP 17 controls the processing commands received over the standard bus interface to control the filters used by the SBRE 4 and the frequencies the synthesizers are tuned to. In addition, the SBRECP 17 will receive commands requesting the status of the SBRE 4 to which the software must respond.

Referring now to FIG. 3, there is shown a block diagram of the SBM 6 of the present invention. The SBM 6 is responsible for modulation/demodulation and encoding/decoding of data transmitted and received over the system. Many elements of the SBM 6 are software driven to support flexibility of modulation and processing rates.

Receive signals are input to the SBM 6 via line 5 at an IF and noise blanker 40. The IF and noise blanker 40 converts the 70 MHz IF signal from the SBRE 4 to a 240 KHz IF signal. The IF and noise blanker 40 also amplifies the IF signal while blanking out interfering pulses and filtering undesired noise from the signal. After amplification and conversion to a 240 KHz IF signal, the signal is passed to a digital demodulator 42 and a linear demodulator 44 implemented using a TMS320C30 digital signal processor.

Figure 11:
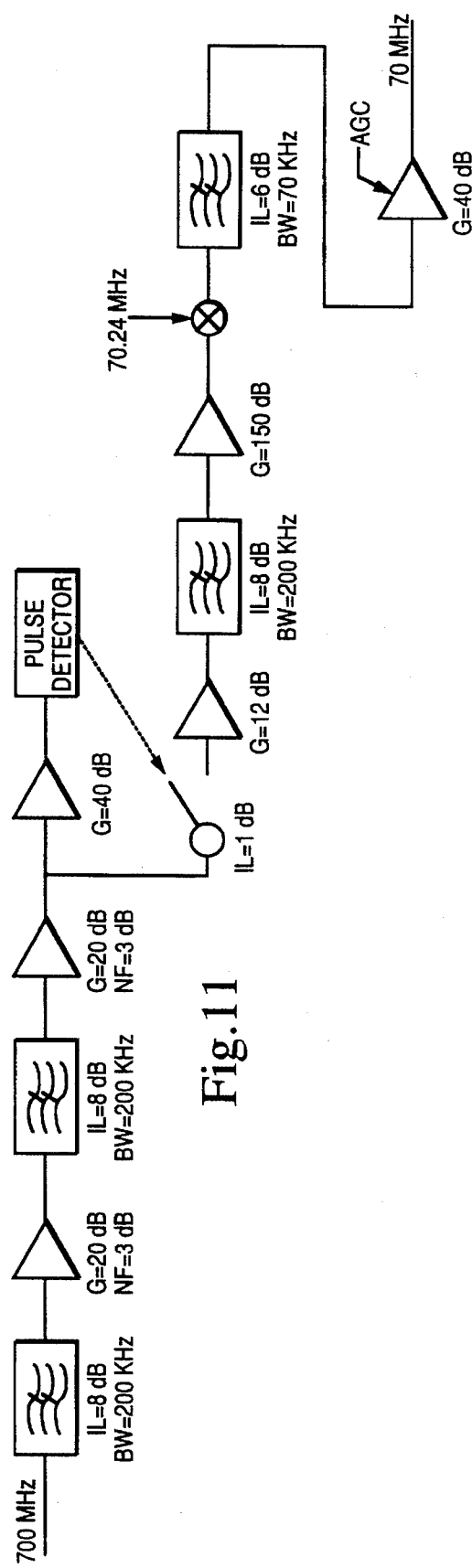
FIG. 11 is a block diagram illustrating the IF portion of the single board modulator.
Figure 12:
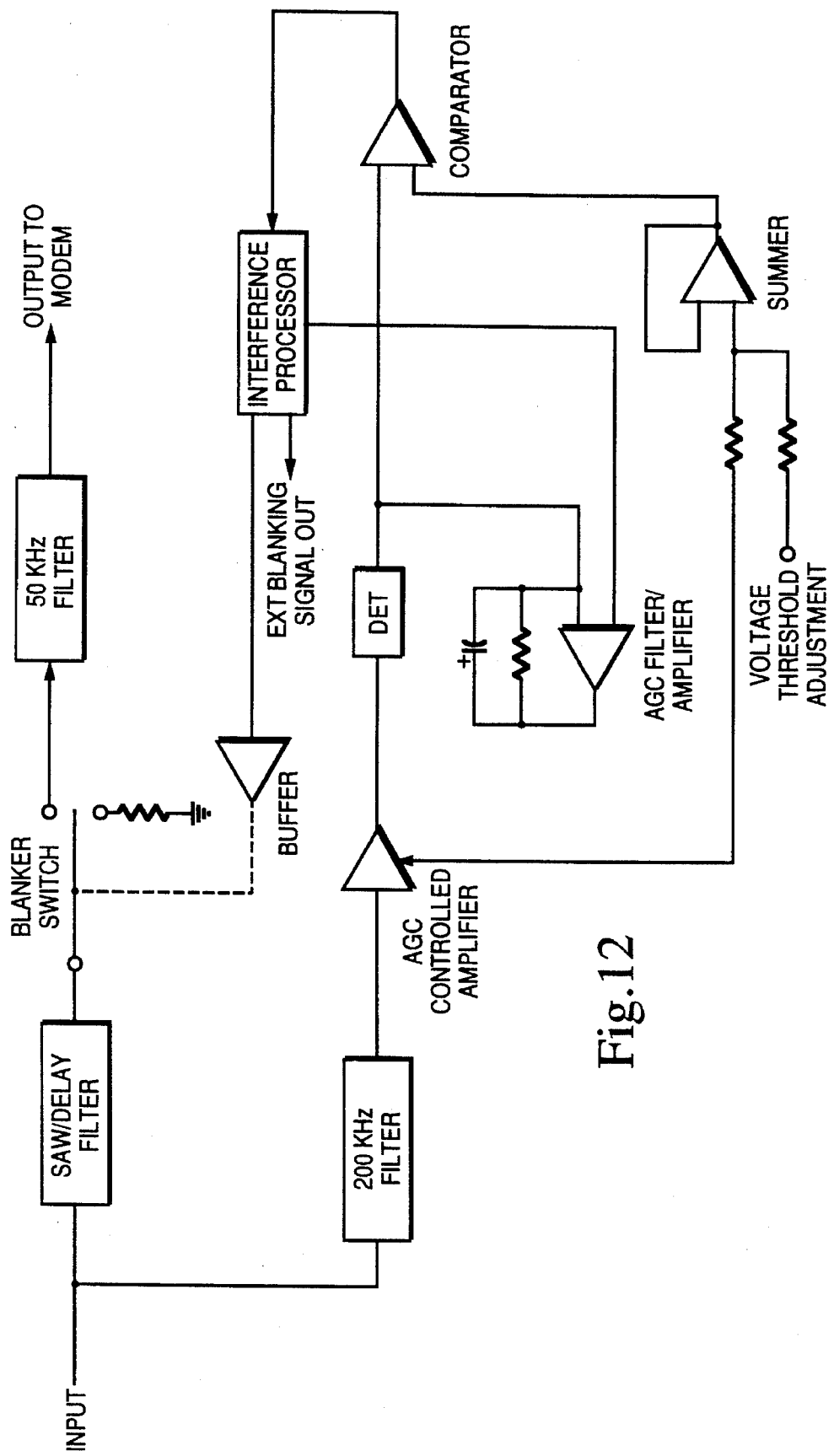
FIG. 12 is a block diagram illustrating the noise blanker portion of the single board modulator.

The IF portion, shown in FIG. 11, of the IF and noise blanker 40 incorporates a series of monolithic amplifiers which do not require tuning. The filter structure employed is a combination of SAW and crystal filters. The SAW filters have Gaussian pass-band characteristics and approximately 200 KHz pass band. The crystal filter establishes a narrow noise bandwidth for the follow-on demodulator process. The narrow bandwidth is required to prevent spectral noise components from lowering the effective processing signal to noise ratio within the demodulator processing bandwidth. The noise blanker portion shown in FIG. 12 uses a combination of SAW filters and delay lines to eliminate both high-level CW and pulse interferers or interference.

The digital demodulator 42 is implemented by means of a TMS320C30 digital signal processor. A majority of the digital demodulator 42 functions are implemented in software allowing flexibility in the type of demodulation applied to the incoming signal. The software may be changed by the system operator to allow different types of modulating schemes to be carried out such as differential and non-differential binary phase shift key, differential quadrature phase shift key, amplitude modulation, frequency modulation, frequency shift key, etc. The software implementation also allows the use of programmable processing rates to meet different system requirements.

The demodulator accepts digital data from an analog to digital (A/D) converter and passes it through a digital formulation of a Costas suppressed carrier tracking loop in an in-phase/mid-phase bit synchronizer for demodulation. After demodulation, the signal is sent to a decoder 46 where decoding and deinterleaving of the signal is carried out. The decoder 46 is implemented with a TMS320C51 digital signal processor. The software in the processor of the decoder 46 uses a straight-forward implementation of the Viterbi convolutional decoding algorithm to decode and deinterleave the signal after demodulation.

Once demodulated and decoded, the signal is sent to a SBM control processor (SBMCP) 48. The demodulated and decoded signal is now under control of the software residing in the SBMCP 48. The digital signal processing associated with modulation, demodulation and convolutional coding of signals is under the direct control of the SBMCP control software. The SBMCP 48 is responsible for higher levels of signal timing. The SBMCP 48 tracks master timing and notifies a processor of a modulator 50 and demodulator 42 of upcoming events. The SBMCP 48 is also responsible for controlling communications between the SBM 6 and the standard bus line. The SBMCP 48 provides signal timing by means of a signal timing and counter circuitry 52. This circuitry 52 properly times the modulation and encoding processes of the SBMCP 48.

The SBMCP 48 receives instructions over the standard bus interface for implementing the proper modulation/demodulation scheme. Once the instructions are received, the proper commands are forwarded through a dual-port RAM interface to the modulator 50 and demodulator 42.

A convolution encoder 54 receives signals from the SBMCP 48 to be transmitted to the SBRE 4. The convolutional encoder 54 encodes and interleaves the data signal before modulation. The encoder 54 is implemented as a part of the same TMS320C51 digital signal processor as the modulator 50 and is substantially software driven. Data is received by the encoder 54 from the SBMCP 48 and convolutionally coded by the software of the control processor. Next, the encoded information is interleaved to randomize potential burst errors and allow the convolutionally coded signal to function in an uncorrelated error environment. The randomization process is software driven using a look-up table where the index of the table corresponds to the current position of a code and the contents of the index position in the table contains the permuted position of the code in a buffer.

Figure 13:
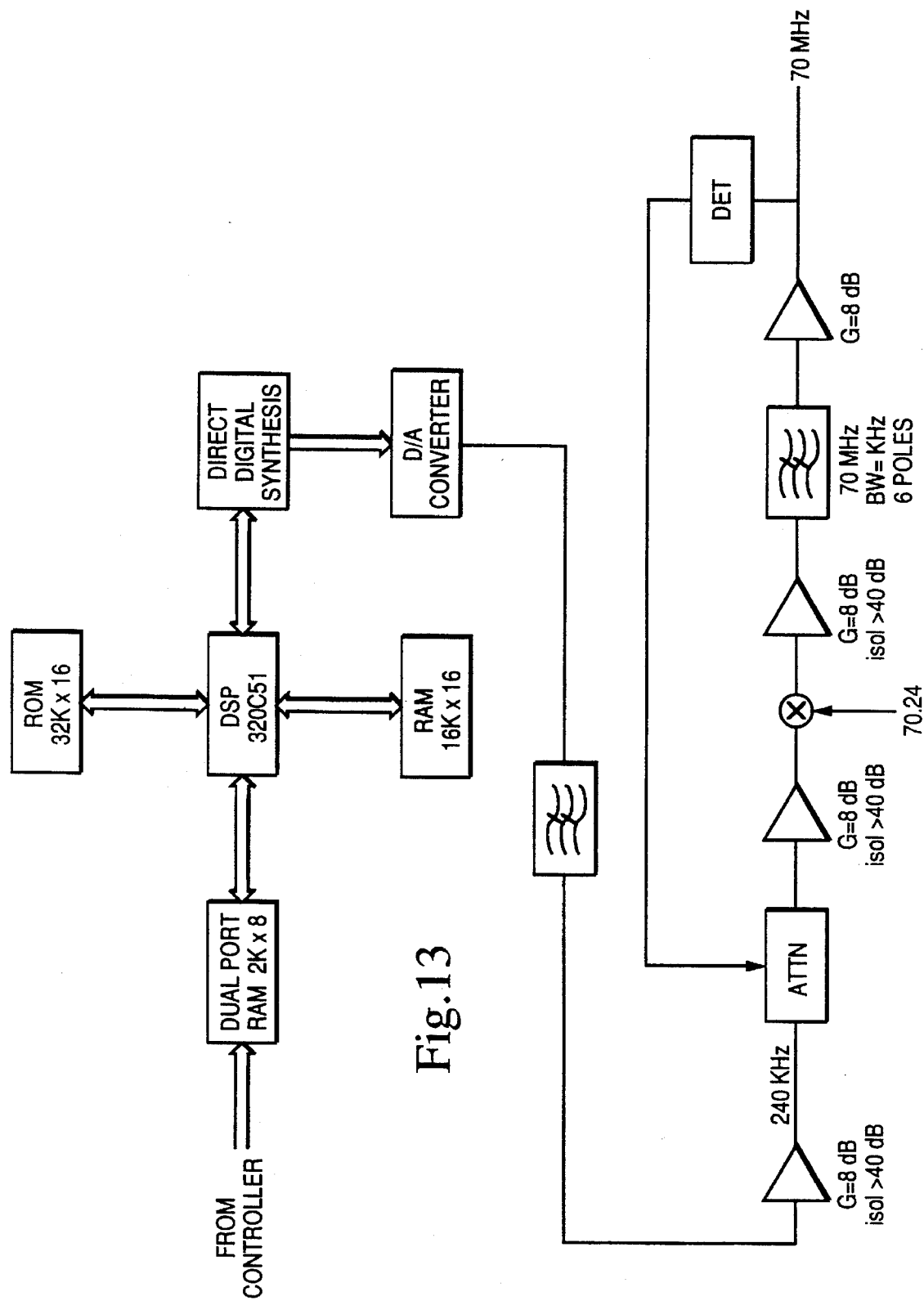
FIG. 13 is a block diagram illustrating the modulator of the single board modulator.

Referring now to FIGS. 3 and 13, the modulator 50 design is similar to the demodulator 42 and is flexible with respect to the type of modulation and signal rates it is capable of generating. The modulator 50 utilizes a TMS320C51 digital signal processor, directional digital synthesis (DDS) device and controlling software to accomplish varying types of phase shift key, amplitude modulation, frequency modulation and frequency shift key modulations. The TMS320C51 digital signal processor also operates to convolutionally encode and interleave the transmitted signal prior to modulation. Once modulated and encoded the signal is converted to analog by a digital to analog (D/A) converter and amplified for transmission to the SBRE 4.

The modulator control processor modulates the signal by generating the digital modulation phase and frequency data necessary for modulation and integrates these words with the transmission signal. The modulator control processor calculates the desired modulating phase signal data input to the DDS device based on the desired output received from the SBMCP 48 and provides the data along with the frequency control data to the DDS necessary to achieve this output. To generate phase modulated signals, the processor provides the DDS device phase control data. After modulation, the signal is amplified to a 70 MHz IF frequency for transmission to the SBRE.

A frequency generator 56 generates frequency signals for the proper down conversion and up conversion of signals within the SBM 6. The frequency generator 56 interacts with most components of the SBM 6 to carry out this function.

Figure 4:
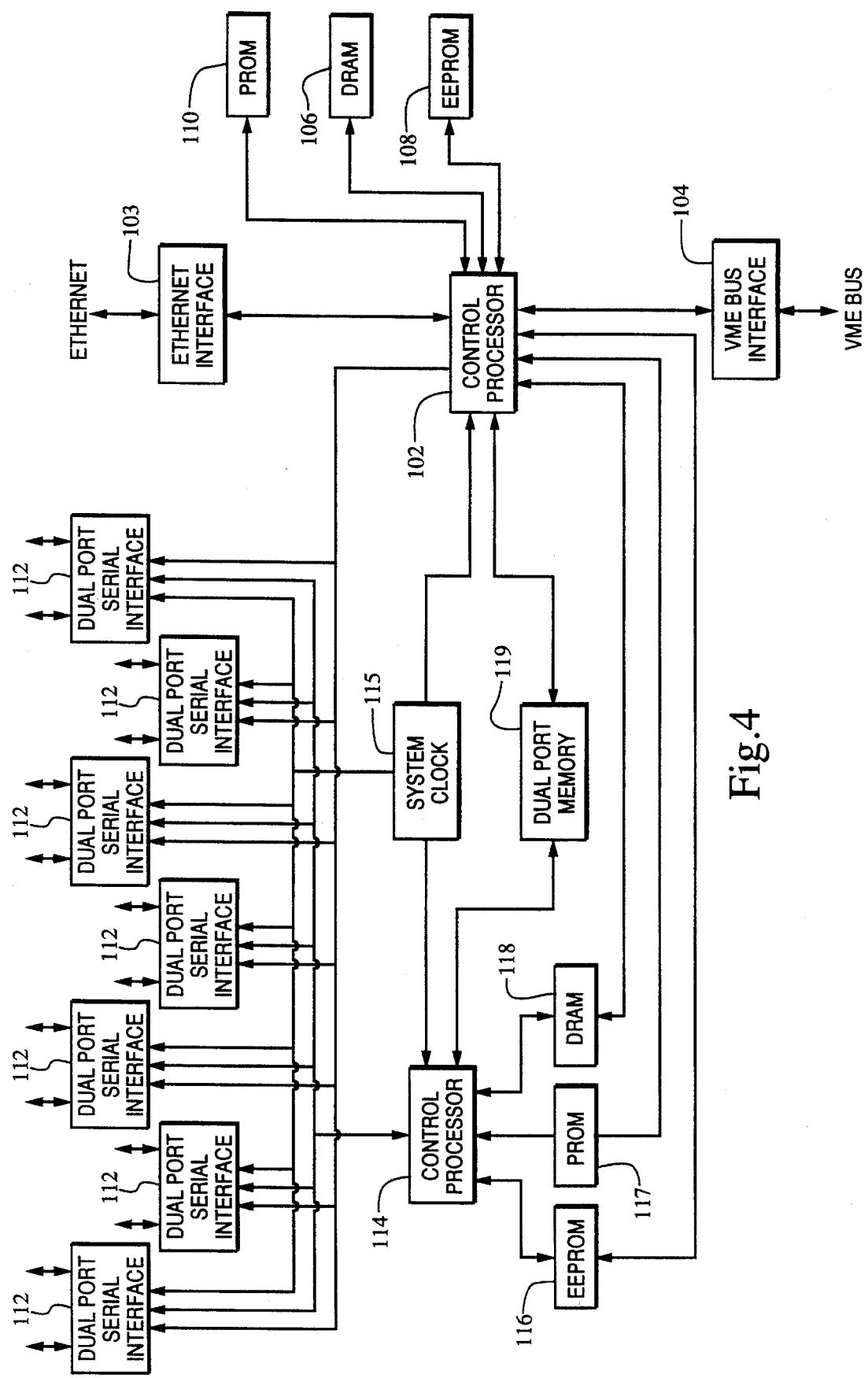
FIG. 4 is a block diagram illustrating the structure of the single board processor multiplexer (SBPM) of the present invention.

Referring now to FIGS. 1 and 4, the single board processor multiplexer (SBPM) 8 provides system level control. Most of the functions of the SBPM 8 are associated with managing the front panel interfaces and communicating configuration and mode information to the SBM 6 and SBRE 4. The SBPM 8 controls all switch group functions and network functions of the system. The SBPM 8 application software provides overall control of the unit and accepts operator commands through a front keyboard panel of the MMPC (120 of FIG. 5) or a remote workstation. Status and control prompts are presented to the operator using menus on a display panel. The SBPM software also controls most of the external digital interfaces used for user communications. In addition to its system initialization responsibilities, the SBPM 8 controls the assignment of operating modes, channel frequencies, and data rates to the SBM 6 and SBRE 4. The functional operation and status of all components of the communications system are monitored through periodic message exchanges between the SBPM 8 and other processors of the system. This includes initiating and reporting unit level self-test activities based on external commands. Thus, failure of system units are detected by the SBPM 8 and other units of the system are notified and reconfigured by the SBPM 8 to compensate for the failed unit.

Referring now to FIG. 4, there is shown a block diagram of the single board processor multiplexer (SBPM) 8. The SBPM 8 consists of a VME bus interface 104, capable of both master and slave operations that interfaces the SBPM 8 to the standard bus line. A control processor 102 provides message handling and also functions as a general purpose control processor. The control processor 102 is comprised of an off-the-shelf MC68030 processor. An ethernet interface 103 provides for control/status interactions between a remote work station (11 in FIG. 1) and the control processor 102. The operating memory for the control processor 102 consists of a dynamic random access memory (DRAM) 106. An electronically erasable programmable read-only memory (EEPROM) 108 connects to the control processor 102 and stores operating system, application code and configuration parameters. The programmable read only memory (PROM) 110 stores SBPM control software.

The SBPM 8 further includes seven dual port serial interfaces 112 to support multiple external interfaces for the communication system. The interfaces 112 operate from 2 to 14 input/output channels for sending and receiving data. An optional control processor 114 is included in the SBPM 8 when required to handle the processing of the dual port serial interfaces 112. The optional control processor 114 interfaces with EEPROM 116, PROM 117 and DRAM 118 each performing the same functions as corresponding elements discussed with respect to the control processor 102. This reduces the processing load on the control processor 102.

System clocks 115 connect to the control processors 102 and 114 and the serial interfaces 112 allowing synchronous control of data and address transmissions over the dual port serial interfaces. The clocks 115 also assist in local timing functions for the SBPM 8. A dual port memory 119 provides the means for efficient transfer of data between control processors 102 and 114.

Figure 5:
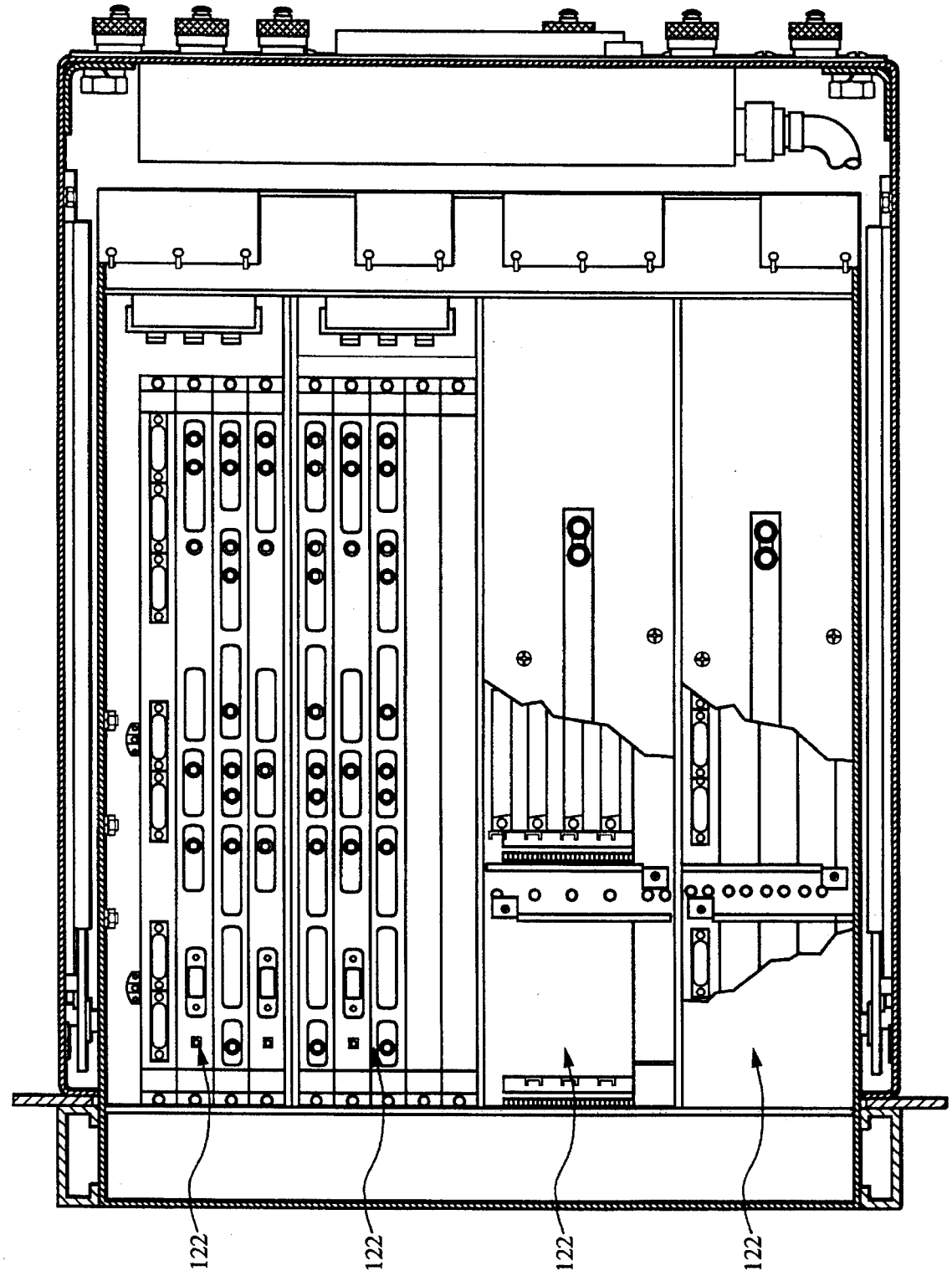
FIG. 5 is an illustration of the inner chassis of the multi-media processor chassis (MMPC)

Referring now to FIG. 5, there is illustrated the multimedia processing chassis (MMPC) 120 of the present invention. The MMPC 120 provides slots to enclose board level units. The MMPC 120 also facilitates standard bus line connections to the boards using VME bus, FutureBus, or some other bus architecture back planes. The interior of the MMPC is broken into four separate compartments 122. Each of these compartments 122 have separate back planes and are physically and electronically isolated. This isolation provides the ability to include functions at various security levels (e.g., top secret, secret, top secret sensitive compartmental information, unclassified) within the same chassis. This allows another level of integration of multiple functions into a single box as opposed to current multiple box configurations. An additional flexibility is provided to the MMCP 120 by permitting the compartments to be combined by jumpering the back plane (standard bus lines) in one compartment 122 to the back plane of the adjacent compartment 122. Therefore, the system is configurable to support different security levels of varying board slot capacity from one application to the next.

Figure 6:
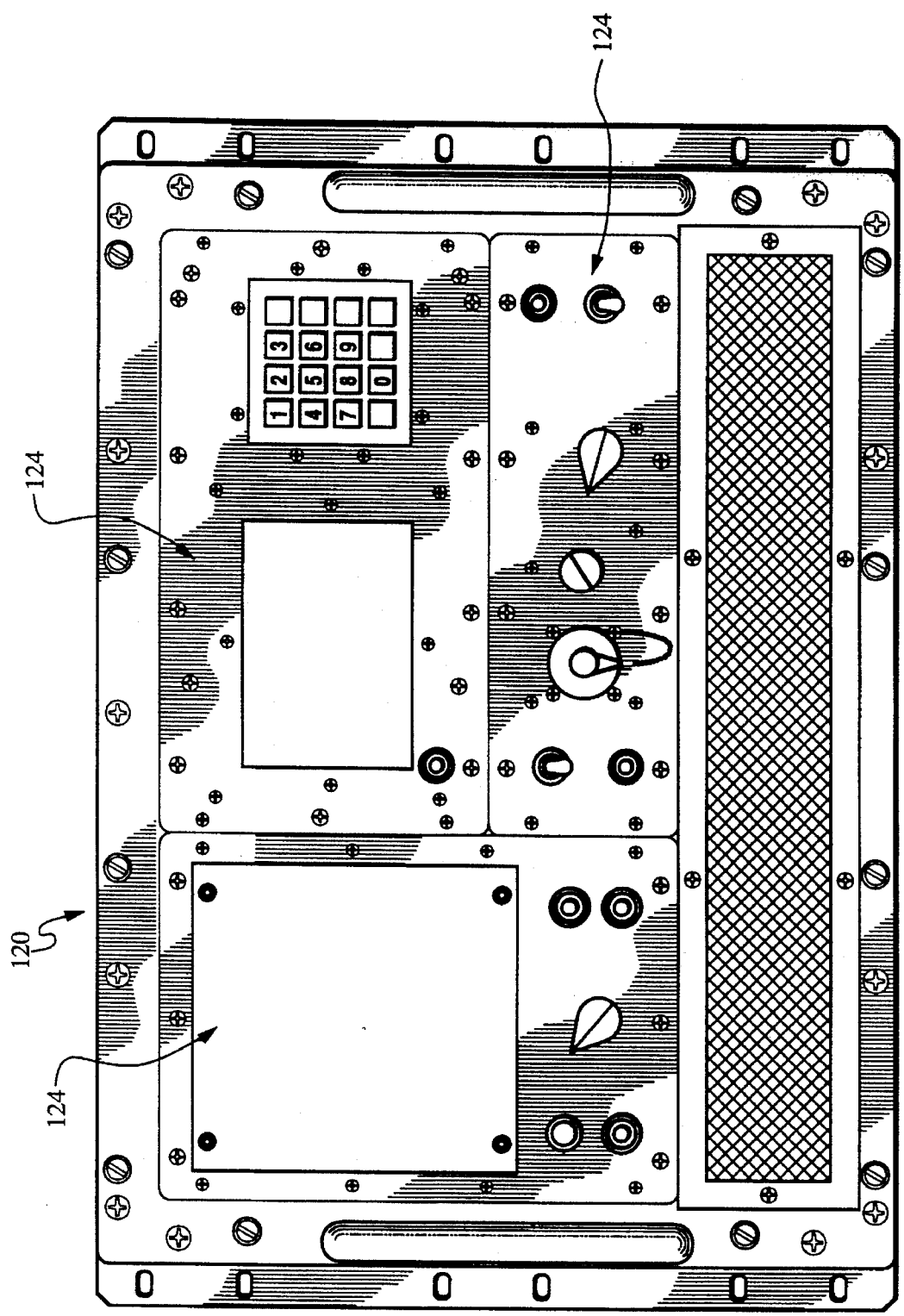
FIG. 6 illustrates the removable and reconfigurable chassis front panels of the outer chassis of the multi-media processor chassis (MMPC)

Referring now to FIG. 6, there is illustrated the front panels 124 of the MMPC 120. The MMPC 120 provides three separate removable panels 124 on the front of the chassis. This enables the MMPC 120 to be configured for each application by changing the front panels 124 without requiring a new custom designed box or chassis having a new front panel. Replacing only the front panels 124 of the basic chassis from one application to the next provides an economic advantage by standardizing the basic chassis and only configuring the low cost panels 124 to support the necessary controls, switches, indicators, displays, connectors, etc. dictated by the particular application.

Figure 7:
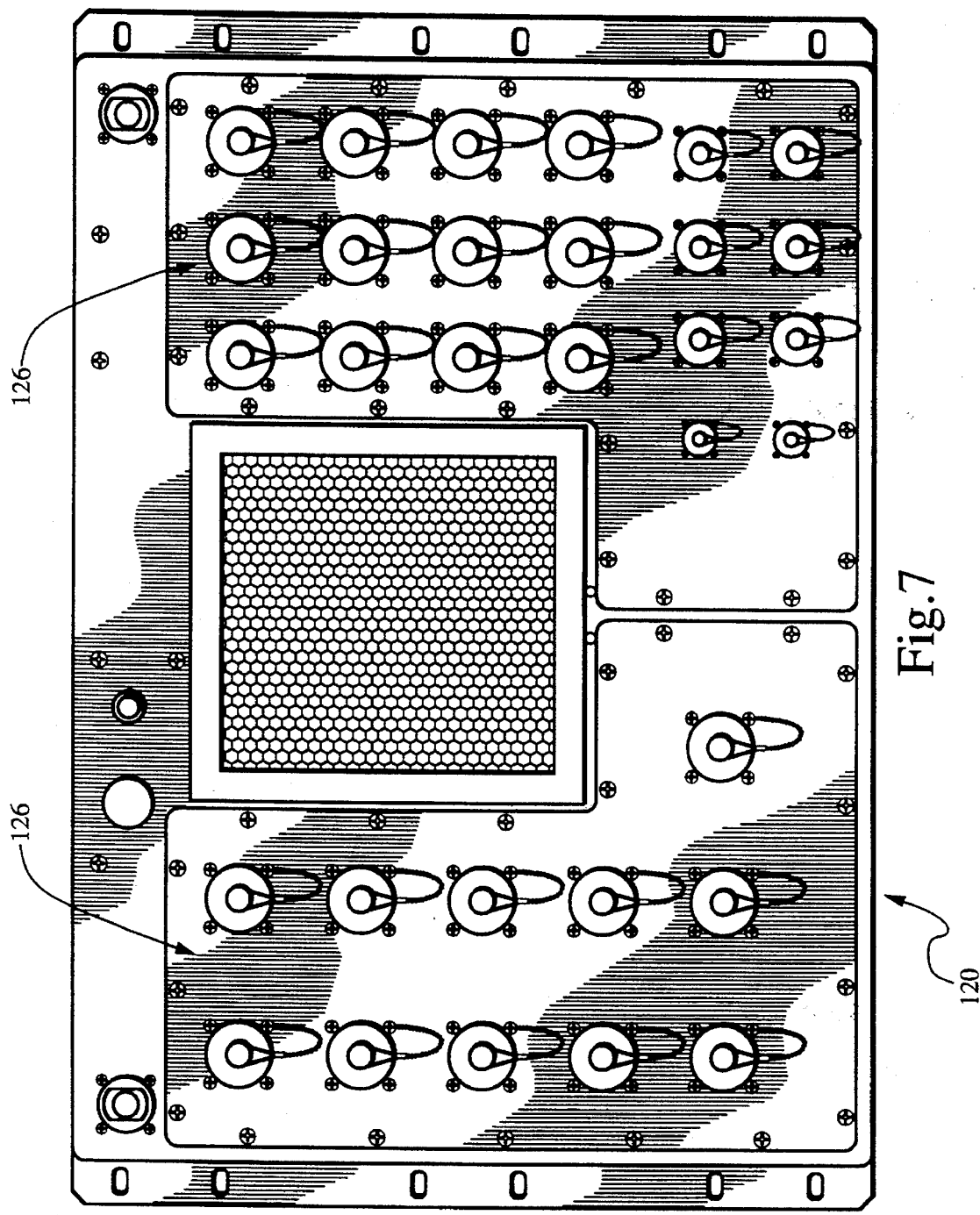
FIG. 7 illustrates the removable and reconfigurable chassis back connecter panels of the outer chassis of the multi-media processor chassis (MMPC)

Likewise, referring to FIG. 7, the same configurable panel implementation is used on the rear panels 126 of the MMPC 120. Removable panels 126 are provided and are configured as required for a particular application. As with the front panel configuration, the back panels 126 provide an economic advantage over current boxes or chassis that require the overall chassis to be modified for each application. Varying applications and their associated connector configurations can be accommodated by using applicable specific panels 126 that can be attached to the back of the MMPC 120.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

We claim:

1. A communication system programmable to operate at a selected one of a multiple of frequency ranges and any one of a plurality of modulation schemes and data rates comprising:

an open architecture bus line;

a programmable single board receiver exciter for receiving and transmitting signals at the selected range of frequencies;

a programmable single board modulator/demodulator for modulating/demodulating and for encoding/decoding the received and transmitted signals;

a programmable single-board processor multiplexer for programming the single board receiver exciter, and the single board modulator/demodulator; and means for interfacing the single board receiver exciter, the single board modulator/demodulator and the single board processor multiplexer with the open architecture bus line.

2. The communication system of claim 1 further comprising a multi-media processor chassis for supporting the single board receiver exciter, the single board modulator/demodulator, and the single board processor multiplexer, and the open architecture bus line.

3. The communication system of claim 2, wherein said multi-media processor chassis further comprises:
a housing for the single board receiver exciter, the single board modulator/demodulator, the single board processor multiplexer and the open architecture bus line;
a plurality of separate security compartments, supported within the housing, each security compartment having a separate back plane; and
a plurality of reconfigurable and removable front panels for the housing, each front panel securing access to one security compartment.

4. The communication system of claim 1, wherein said single board receiver exciter further comprises:
a control processor for processing commands received over the open architecture bus line, said control processor generating control commands in response to commands received over the open architecture bus line;
preselector means responsive to control commands from the control processor for filtering received signals to the selected operating frequency;
synthesizer means responsive to control commands from the control processor for generating a signal to be mixed with the received signal;
receiver converter means for mixing the received signal with the synthesizer signal to produce a predetermined signal frequency;
transmitter converter means for mixing a transmitted signal with the synthesizer signal to produce a predetermined output frequency; and
an exciter/amplifier responsive to control commands from the control processor for filtering and amplifying the transmitted signal from the transmitter converter means.

5. The communication system of claim 4, wherein said preselector means further comprises means responsive to control commands from the control processor for programming the filtering of the received signal.

6. The communication system of claim 4, wherein said exciter/amplifier further comprises means responsive to control commands from the control processor for programming the filtering of the transmitted signal.

7. The communication system of claim 4, wherein said control processor further comprises means for determining the synthesizer signal required to achieve a predetermined output.

8. The communication system of claim 1, wherein the single board modulator/demodulator comprises:
a control processor for processing commands received over the open architecture bus line and for processing received and transmitted signals, said controller processor generating control commands in response to the commands received over the open architecture bus line;
an IF and noise blanker for filtering and blocking unwanted noise and spurious signals;
means responsive to control commands from the control processor for demodulating the received signal;
programmable means for decoding and deinterleaving received signals;
programmable means for encoding and interleaving signals prior to transmission; and
means responsive to commands from the control processor for modulating the signal prior to transmission.

9. The communication system of claim 8, wherein the demodulating means further comprises:
means for operating any one of a variety of demodulation schemes; and
means for operating at any one of a plurality of data rates.

10. The communication system of claim 8, wherein the modulating means further comprises:
means for operating any one of a variety of modulation schemes; and
means for operating at any one of a plurality of data rates.

11. The communication system of claim 8, wherein said decoding means further includes means for implementing a Viterbi convolutional decoding algorithm.

12. The communication system of claim 8, further including a linear demodulator for audio signal demodulation.

13. The communication system of claim 8, further including a frequency synthesizer for generating injection frequencies.

14. The communication system of claim 8, further including a timing means for assisting the control processor in processing received signals.

15. The communication system of claim 8, further wherein the programmable single board processor multiplexer operates in a plurality data transmission and processing modes.

16. The communication system of claim 1 wherein the single board processor multiplexer comprises:
a bus line interface to enable the single board processor and multiplexer to communicate with the open architecture bus line;
a plurality of serial interface means for multichannel input/output communication to the single board processor multiplexer; and
processing means for controlling operation of the multichannel input/output communication of the processor multiplexer in response to commands received over the open architecture bus line.

17. The communication system of claim 16 wherein the single board processor multiplexer, further includes means for synchronous control of data and address transmissions over the plurality of serial interface means.

18. The communication system of claim 16 wherein the single board processor multiplexer, further includes memory means for storing data and instructions received over the plurality of serial interface means and the bus line interface.

* * * * *